United States Patent
Wang et al.

(10) Patent No.: US 11,317,338 B2
(45) Date of Patent: Apr. 26, 2022

(54) ACCESS CONTROL METHOD AND APPARATUS

(71) Applicant: HUAWEI TECHNOLOGIES CO., LTD., Shenzhen (CN)

(72) Inventors: Hong Wang, Beijing (CN); Wei Quan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/829,884

(22) Filed: Mar. 25, 2020

(65) Prior Publication Data
US 2020/0229070 A1    Jul. 16, 2020

Related U.S. Application Data

(63) Continuation of application No. PCT/CN2017/104126, filed on Sep. 28, 2017.

(51) Int. Cl.
| | |
|---|---|
| H04W 48/06 | (2009.01) |
| H04W 48/16 | (2009.01) |
| H04W 28/02 | (2009.01) |

(52) U.S. Cl.
CPC ....... *H04W 48/06* (2013.01); *H04W 28/0236* (2013.01); *H04W 48/16* (2013.01)

(58) Field of Classification Search
CPC .. H04W 48/06; H04W 48/16; H04W 28/0236
USPC ......................................... 370/230
See application file for complete search history.

(56) References Cited

U.S. PATENT DOCUMENTS

| | | | |
|---|---|---|---|
| 8,712,469 B2 | 4/2014 | Whinnett et al. | |
| 9,913,181 B1* | 3/2018 | Oroskar | H04W 24/10 |
| 2015/0173119 A1* | 6/2015 | Wirtanen | H04W 76/18 |
| | | | 455/452.1 |
| 2015/0230094 A1 | 8/2015 | Bae | |

(Continued)

FOREIGN PATENT DOCUMENTS

| | | |
|---|---|---|
| CN | 101785336 A | 7/2010 |
| CN | 102045810 A | 5/2011 |

(Continued)

OTHER PUBLICATIONS

3GPP TS 36.331 V14.4.0:"3rd Generation Partnership Project; Technical Specification Group Radio Access Network; Evolved Universal Terrestrial Radio Access (E-UTRA); Radio Resource Control (RRC); Protocol specification (Release 14)",Sep. 2017,total 354 pages.

(Continued)

*Primary Examiner* — Faisal Choudhury
(74) *Attorney, Agent, or Firm* — Stein IP, LLC

(57) ABSTRACT

An access control method and an apparatus, such that a network device sends an access control configuration information to a terminal device, where the access control configuration information is used to indicate access control mode information corresponding to at least one coverage area; and the terminal device determines the access control mode of the terminal device based on the access control configuration information and a coverage area of the terminal device. As a result, terminal devices in a network may be prevented from impacting on the network when the terminal devices simultaneously access the network, to reduce network congestion.

17 Claims, 11 Drawing Sheets

(56) References Cited

U.S. PATENT DOCUMENTS

2017/0006043 A1     1/2017  Da et al.
2018/0310228 A1*   10/2018  Rune .................... H04W 48/14
2020/0221500 A1*    7/2020  Zhang ............... H04W 74/0833

FOREIGN PATENT DOCUMENTS

| | | |
|---|---|---|
| CN | 102469549 A | 5/2012 |
| CN | 103069869 A | 4/2013 |
| CN | 104378730 A | 2/2015 |
| CN | 104581757 A | 4/2015 |
| CN | 106255112 A | 12/2016 |
| CN | 106792983 A | 5/2017 |
| CN | 107105482 A | 8/2017 |
| EP | 3094137 A1 | 11/2016 |
| WO | 2015140274 A1 | 9/2015 |
| WO | 2016077949 A1 | 5/2016 |
| WO | 2016163745 A1 | 10/2016 |

OTHER PUBLICATIONS

Alcatel-Lucent, Alcatel-Lucent Shanghai Bell, Coverage Enhancement Targets. 3GPP TSG RAN WG1 Meeting #79, San Francisco, USA, 17th Nov. 21, 2014, R1-144695, 3 pages.

Jin Yang et al., LTE Field Performance for IoT Applications. 2016 IEEE 84th Vehicular Technology Conference (VTC-Fall), Mar. 20, 2017, 5 pages.

Huawei (Rapporteur), 36.331 Running CR to capture agreements on NB-IoT. 3GPP TSG-RAN WG2#93BIS Meeting, Dubrovnik, Croatia, Apr. 11-15, 2016, R2-163054, 61 pages.

Zhao Jia, Research on Association Control and Mobility in Heterogeneous Networks. Xidian University, 2016, 1 page.

* cited by examiner

ACCESS CONTROL METHOD AND APPARATUS

CROSS-REFERENCE TO RELATED APPLICATIONS

This application is a continuation of International Application No. PCT/CN2017/104126, filed on Sep. 28, 2017, the disclosure of which is hereby incorporated by reference in its entirety.

TECHNICAL FIELD

Embodiments of this application relate to the communications technologies, and in particular, to an access control method and an apparatus.

BACKGROUND

Machine type communication (Machine Type Communication, MTC) is machine-to-machine (M2M) communication, and is a technology of transmitting data from one terminal to another terminal. For wireless network access, an electronic device having a wireless access capability may directly access a wireless network by using a subscriber identity module/universal subscriber identity module (SIM/USIM) card, or may access the wireless network by relaying by one gateway device in a manner such as Bluetooth or Zigbee, thereby implementing communication with an MTC server or another device.

MTC communication does not focus on data transmission rates, or multiband, multi-antenna, and full-duplex transmission, and instead, focuses on longer battery life of the terminal apparatus and lower costs of the terminal apparatus, that is, the terminal is required to implement low power consumption ( ) and low costs. In an application scenario of a terminal of the MTC type, for example, a water meter or an electricity meter, a signal coverage strength of the terminal cannot meet a requirement of signal reception. Therefore, the MTC is enhanced, so that a base station and the terminal can support coverage enhancement. A main method for implementing the coverage enhancement is to repeatedly send uplink signals or downlink signals for a plurality of times, and a success rate of data reception is improved through reception and combination for a plurality of times.

However, a larger quantity of times of repeated transmission indicates more consumed time-frequency resources. Based on a degree of the enhanced coverage, for example, based on the quantity of times of repeated transmission, the enhanced coverage is divided into different levels, and different enhanced coverage levels correspond to different quantities of times of repeated transmission. When an enhanced coverage level is relatively high, a larger quantity of times of repeated transmission are required, and more resources are consumed. Due to a relatively large deployment number of terminals of the MTC type, network congestion is caused if a network accepts connection setup requests from all terminals in a short period of time.

SUMMARY

Embodiments of this application provide an access control method and an apparatus, to prevent terminal devices in a network from impacting on the network when the terminal devices simultaneously access the network, to reduce network congestion.

According to a first aspect, an embodiment of this application provides an access control method, including: receiving, by a terminal device, access control configuration information sent by a network device, where the access control configuration information is used to indicate an access control mode corresponding to at least one coverage area; determining, by the terminal device, a coverage area of the terminal device; and determining, by the terminal device, the access control mode of the terminal device based on the access control configuration information and the coverage area of the terminal device.

With reference to the first aspect, in one possible implementation of the first aspect, the access control configuration information includes at least one piece of access control mode information, where the access control mode information corresponds to the at least one coverage area; and the determining, by the terminal device, the access control mode of the terminal device based on the access control configuration information and the coverage area of the terminal device includes: obtaining, by the terminal device, access control mode information corresponding to the coverage area of the terminal device from the at least one piece of access control mode information, and determining the access control mode of the terminal device based on the access control mode information corresponding to the coverage area of the terminal device.

With reference to the first aspect or the possible implementation of the first aspect, in another possible implementation of the first aspect, the access control configuration information further includes at least one probability factor, and the method further includes: determining, by the terminal device, an access probability based on the coverage area corresponding to the terminal device and the at least one probability factor; and determining, by the terminal device based on the access probability, whether to perform the access control mode.

With reference to the first aspect or any one of the possible implementations of the first aspect, in another possible implementation of the first aspect, the determining, by the terminal device based on the access probability, whether to perform the access control mode includes: obtaining, by the terminal device, a first random number, and when the first random number is greater than the access probability, determining to perform the access control mode, and when the first random number is not greater than the access probability, determining to skip performing the access control mode; or obtaining, by the terminal device, a first random number, and when the first random number is less than the access probability, determining to perform the access control mode, and when the first random number is not less than the access probability, determining to skip performing the access control mode.

With reference to the first aspect or any one of the possible implementations of the first aspect, in another possible implementation of the first aspect, the access control configuration information includes at least one probability factor, and the determining, by the terminal device, the access control mode of the terminal device based on the access control configuration information and the coverage area of the terminal device includes: determining, by the terminal device, an access probability based on the coverage area corresponding to the terminal device and the at least one probability factor; and determining, by the terminal device, the access control mode of the terminal device based on the access probability.

With reference to the first aspect or any one of the possible implementations of the first aspect, in another possible implementation of the first aspect, the determining, by the terminal device, an access probability based on the coverage area corresponding to the terminal device and the at least one probability factor includes: determining, by the terminal device, the access probability based on a formula $p=k_n \times q^n + k_{n-1} \times q^{n-1} + k_{n-2} \times q^{n-2} + \ldots + k_1 \times q^1 + k_0$, where p is the access probability, q is reference signal received power RSRP or reference signal received quality RSRQ measured by the terminal device, $\{k_n, k_{n-1}, k_{n-2}, \ldots, k_0\}$ is the at least one probability factor, and n is any natural number.

With reference to the first aspect or any one of the possible implementations of the first aspect, in another possible implementation of the first aspect, the determining, by the terminal device, the access control mode of the terminal device based on the access probability includes: obtaining, by the terminal device, a second random number, and when the second random number is greater than the access probability, determining that the access control mode is a first access control mode, and when the second random number is not greater than the access probability, determining that the access control mode is a second access control mode; or obtaining, by the terminal device, a second random number, and when the second random number is less than the access probability, determining that the access control mode is a first access control mode, and when the second random number is not less than the access probability, determining that the access control mode is a second access control mode.

With reference to the first aspect or any one of the possible implementations of the first aspect, in another possible implementation of the first aspect, the access control mode includes accessing a current cell, entering a preset access control process, camping on the current cell, skipping accessing the current cell, skipping entering the preset access control process, or skipping camping on the current cell, where the preset access control process includes any one or more of an extended access barring EAB process, a service specific access control SSAC process, an access class barring ACB process, or an application specific access control ACDC process, and the first access control mode and the second access control mode are any two access control modes. "Any one of x, y or z" refers to x, to y, to z or any combination thereof throughout this specification.

The first access control mode and the second access control mode may be two access control modes set in the terminal device, and the terminal device may determine one of the two as the access control mode of the terminal device based on the access control configuration information sent by the network device.

With reference to the first aspect or any one of the possible implementations of the first aspect, in another possible implementation of the first aspect, when the access control mode of the terminal device is the skipping accessing the current cell, the method further includes: starting, by the terminal device, a timer, and notifying a non-access stratum that the current cell is barred from being accessed; or when the access control mode of the terminal device is the skipping camping on the current cell, the method further includes: performing, by the terminal device, cell reselection.

With reference to the first aspect or any one of the possible implementations of the first aspect, in another possible implementation of the first aspect, the receiving, by a terminal device, access control configuration information sent by a network device includes: receiving, by the terminal device, system information sent by the network device, where the system information carries the access control configuration information, and the system information is one of the following information types: a system information block SIB 2, a system information block SIB 14, a system information block SIB 1, and a master information block MIB.

With reference to the first aspect or any one of the possible implementations of the first aspect, in another possible implementation of the first aspect, the method further includes: receiving, by the terminal device, an indication message sent by the network device, where the indication message is used to indicate that the access control configuration information is already updated or to be updated; and obtaining, by the terminal device, updated access control configuration information based on the indication message.

With reference to the first aspect or any one of the possible implementations of the first aspect, in another possible implementation of the first aspect, the indication message includes one piece of bit information, and the obtaining, by the terminal device, updated access control configuration information based on the indication message includes: obtaining, by the terminal device, the updated access control configuration information based on the one piece of bit information; or the indication message includes M pieces of bit information, where M is a quantity of pieces of the at least one piece of access control mode information, and each piece of bit information corresponds to one piece of the access control mode information, and the obtaining, by the terminal device, updated access control configuration information based on the indication message includes: obtaining, by the terminal device, bit information of the terminal device from the M pieces of bit information; determining, based on the bit information of the terminal device, whether the access control mode information of the terminal device is already updated or to be updated; and obtaining, by the terminal device, the updated access control configuration information when the access control mode information of the terminal device is updated or to be updated, where the bit information of the terminal device is a bit corresponding to the access control mode information corresponding to the coverage area of the terminal device; or the indication message includes N pieces of bit information, where N is a quantity of the at least one coverage area, and each piece of bit information corresponds to one coverage area, and the obtaining, by the terminal device, updated access control configuration information based on the indication message includes: obtaining, by the terminal device, bit information corresponding to the coverage area of the terminal device from the N pieces of bit information; determining, based on the bit information corresponding to the coverage area of the terminal device, whether the access control mode information corresponding to the coverage area of the terminal device is already updated or to be updated; and obtaining, by the terminal device, the updated access control configuration information when the access control mode information corresponding to the coverage area of the terminal device is already updated or to be updated.

According to a second aspect, an embodiment of this application provides an access control method, including: determining, by a network device, access control configuration information, where the access control configuration information is used to indicate an access control mode corresponding to at least one coverage area; and sending, by the network device, the access control configuration information to a terminal device, where the access control configuration information is used to determine the access control mode of the terminal device.

With reference to the second aspect, in one possible implementation of the second aspect, the access control configuration information includes at least one piece of access control mode information, the access control mode information corresponds to the at least one coverage area, the access control mode information is used to indicate the access control mode corresponding to the at least one coverage area corresponding to the access control mode information, and the at least one piece of access control mode information is used to determine the access control mode of the terminal device.

With reference to the second aspect or the possible implementation of the second aspect, in another possible implementation of the second aspect, the access control configuration information further includes at least one probability factor, the at least one probability factor is used to determine an access probability of the terminal device, and the access probability is used to determine whether to perform the access control mode of the terminal device.

With reference to the second aspect or any one of the possible implementations of the second aspect, in another possible implementation of the second aspect, the access control configuration information includes at least one probability factor, the at least one probability factor is used to determine an access probability of the terminal device, and the access probability is used to determine the access control mode of the terminal device.

With reference to the second aspect or any one of the possible implementations of the second aspect, in another possible implementation of the second aspect, the access control mode includes accessing a current cell, entering a preset access control process, skipping accessing the current cell, camping on the current cell, skipping camping on the current cell, or skipping entering the preset access control process, where the preset access control process includes any one or more of an extended access barring EAB process, a service specific access control SSAC process, an access class barring ACB process, or an application specific access control ACDC process.

With reference to the second aspect or any one of the possible implementations of the second aspect, in another possible implementation of the second aspect, the sending, by the network device, the access control configuration information to a terminal device includes: sending, by the network device, the access control configuration information to the terminal device by using system information, where the system information is one of the following information types: a system information block SIB 2, a system information block SIB 14, a system information block SIB 1, or a master information block MIB.

With reference to the second aspect or any one of the possible implementations of the second aspect, in another possible implementation of the second aspect, the method further includes: sending, by the network device, an indication message to the terminal device, where the indication message is used to indicate that the access control configuration information is already updated or to be updated, and the indication message is carried in a paging message and/or system information.

With reference to the second aspect or any one of the possible implementations of the second aspect, in another possible implementation of the second aspect, the indication message includes one piece of bit information, where the bit information is used to indicate that the access control configuration information is already updated or to be updated; or the indication message includes M pieces of bit information, where M is a quantity of pieces of the at least one piece of access control mode information, each piece of bit information corresponds to one piece of access control mode information, and each piece of bit information is used to indicate that the access control mode information corresponding to the bit information is already updated or to be updated; or the indication message includes N pieces of bit information, where N is a quantity of the at least one coverage area, each piece of bit information corresponds to one coverage area, and each piece of bit information is used to indicate that access control information corresponding to the coverage area corresponding to the bit information is already updated or to be updated.

According to a third aspect, an embodiment of this application provides an apparatus. The apparatus may be a terminal device, or a part on a structure of a terminal device, or may be an apparatus that is structurally independent of a terminal device, and the apparatus has a function of implementing behaviors of the terminal device according to the first aspect or any one of the implementations of the first aspect. The function may be implemented by using hardware, or may be implemented by hardware by executing corresponding software. The hardware or software includes one or more modules corresponding to the foregoing function.

According to a fourth aspect, an embodiment of this application provides an apparatus. The apparatus may be a terminal device, or a part on a structure of a terminal device, or may be an apparatus that is structurally independent of a terminal device. The apparatus includes: a processor, a memory, a bus, and a communications interface, where the memory is configured to store a computer executable instruction, the processor is connected to the memory by using the bus, and when the terminal device runs, the processor executes the computer executable instruction stored in the memory, to enable the terminal device to perform the access control method according to the first aspect or any one of the implementations of the first aspect.

According to a fifth aspect, an embodiment of this application provides a computer-readable storage medium, configured to store a computer software instruction used by the terminal device, where when the computer software instruction is run on a computer, the computer is enabled to perform the access control method according to the first aspect or any one of the implementations of the first aspect.

According to a sixth aspect, an embodiment of this application provides a computer program product including an instruction, where when the computer program product is run on a computer, the computer is enabled to perform the access control method according to the first aspect or any one of the implementations of the first aspect.

According to a seventh aspect, an embodiment of this application provides an apparatus. The apparatus may be a network device, or a part on a structure of a network device, or may be an apparatus that is structurally independent of a network device, and the apparatus has a function of implementing behaviors of the network device according to the second aspect or any one of the implementations of the second aspect. The function may be implemented by using hardware, or may be implemented by hardware by executing corresponding software. The hardware or software includes one or more modules corresponding to the foregoing function.

According to an eighth aspect, an embodiment of this application provides an apparatus. The apparatus may be a network device, or a part on a structure of a network device, or may be an apparatus that is structurally independent of a network device. The apparatus includes: a processor, a memory, a bus, and a communications interface, where the memory is configured to store a computer executable instruction, the processor is connected to the memory by using the bus, and when the network device runs, the processor executes the computer executable instruction stored in the memory, to enable the network device to perform the access control method according to the second aspect or any one of the implementations of the second aspect.

According to a ninth aspect, an embodiment of this application provides a computer-readable storage medium, configured to store a computer software instruction used by the network device, where when the computer software instruction is run on a computer, the computer is enabled to perform the access control method according to the second aspect or any one of the implementations of the second aspect.

According to a tenth aspect, an embodiment of this application provides a computer program product including an instruction, where when the computer program product is run on a computer, the computer is enabled to perform the access control method according to the second aspect or any one of the implementations of the second aspect.

According to an eleventh aspect, an embodiment of this application provides a chip, including: a memory and a processor, where the memory is configured to store a program instruction; and the processor is configured to invoke the program instruction stored in the memory, to implement the access control method according to the first aspect or any one of the implementations of the first aspect.

According to a twelfth aspect, an embodiment of this application provides a chip, including: a memory and a processor, where the memory is configured to store a program instruction; and the processor is configured to invoke the program instruction stored in the memory, to implement the access control method according to the second aspect or any one of the implementations of the second aspect.

According to a thirteenth aspect, an embodiment of this application provides a storage medium, including: a readable storage medium and a computer program, and the computer program is configured to implement the access control method according to the first aspect or any one of the implementations of the first aspect.

According to a fourteenth aspect, an embodiment of this application provides a storage medium, including: a readable storage medium and a computer program, and the computer program is configured to implement the access control method according to the second aspect or any one of the implementations of the second aspect.

According to a fifteenth aspect, an embodiment of this application provides a program product, the program product includes a computer program, the computer program is stored in a readable storage medium, at least one processor of a communications device may read the computer program from the readable storage medium, and the at least one processor executes the computer program to enable the communications device to perform the access control method according to the first aspect or any one of the implementations of the first aspect.

According to a sixteenth aspect, an embodiment of this application provides a program product, the program product includes a computer program, the computer program is stored in a readable storage medium, at least one processor of a communications device may read the computer program from the readable storage medium, and the at least one processor executes the computer program to enable the communications device to perform the access control method according to the second aspect or any one of the implementations of the second aspect.

According to the access control method and the apparatus provided in the embodiments of this application, the network device sends the access control configuration information to the terminal device, where the access control configuration information is used to indicate the access control mode information corresponding to the at least one coverage area; and the terminal device determines the access control mode of the terminal device based on the access control configuration information and the coverage area of the terminal device, to perform corresponding operations by using the access control mode of the terminal device, thereby preventing the terminal devices in a network from impacting on the network when the terminal devices simultaneously access the network, to reduce network congestion.

BRIEF DESCRIPTION OF DRAWINGS

To describe the technical solutions in the embodiments of this application or in the prior art more clearly, the following briefly describes the accompanying drawings required for describing the embodiments or the prior art.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application.

Figure 1:
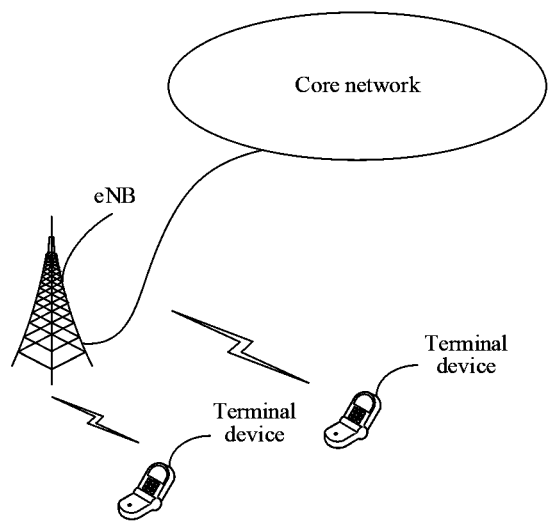
FIG. 1 is a schematic diagram of an application scenario of an access control method according to an embodiment of this application.

FIG. 1 is a schematic diagram of an application scenario of an access control method according to an embodiment of this application. As shown in FIG. 1, the access control method of this application may specifically be applied to a long term evolution (LTE) communications system. A terminal device accesses a core network through an evolved NodeB (eNB), and a base station provides a radio resource management function, a function of organizing and sending a paging message, a function of organizing and sending a broadcast message, and the like. According to the access control method of this application, an access control mode may be configured for terminal devices within different coverage areas, to enable the terminal devices to access a network by using the access control mode configured by the base station, thereby preventing the terminal devices in the network from impacting on the network when the terminal devices simultaneously access the network, to reduce network congestion.

It should be noted that, the access control method of this application may also be applied to a 5G communications system, and correspondingly, the eNB is replaced with a distributed unit (DU) or a centralized unit (CU). The access control method may further be applied to any suitable communications system, and the network device and the terminal device are a network side device and a terminal side device in the corresponding communications system.

The network device in this application may be specifically a wireless access device, for example, may be an eNB, a DU, a CU, a NodeB, a gNB in a future communications system or an access node in a Wi-Fi system. The specific technology used by the network device and a specific device form are not limited in the embodiments of this application.

The terminal device in this application may be specifically a wireless access device, for example, may also be referred to as a terminal, user equipment (UE), a mobile station (MS), or a mobile terminal (MT). The terminal device may be a mobile phone, a tablet computer (such as a Pad), a computer having a wireless transmission and receiving function, a machine type communication (MTC) terminal, a virtual reality (VR) terminal, an augmented reality (AR) terminal, a wireless terminal in industrial control, a wireless terminal in self driving, a wireless terminal in a remote medical surgery, a wireless terminal in transportation safety, a wireless terminal in a smart city, a wireless terminal in a smart home, or the like.

The MTC terminal is an electronic device that uses the MTC technology, and the electronic device supports low power consumption, low complexity and coverage enhancement. For example, the electronic device may be a wireless terminal in a smart grid, such as an electricity meter, or may be a water meter. The MTC technology is a communications technology introduced by third generation partnership project (3GPP) in evolution of an LTE technology for the development of Internet of Things (Internet of Things, IoT), and is specifically used for communication of an electronic device with low power consumption and low costs.

The network device and the terminal device of this application may be deployed on land, including an indoor or outdoor device, a handheld device, or an in-vehicle device; or may be deployed on water; or may be deployed in air, for example, on an air plane, a balloon, or a man-made satellite. Application scenarios of the network device and the terminal device are not limited in the embodiments of this application.

The "coverage area" in this application is specifically an area in which a strength of a reference signal satisfies a condition. The strength of a reference signal of the network device measured by the terminal device in this area satisfies the condition, and the condition may be flexibly set based on a requirement. Selection under different conditions may divide the coverage area of the network device into one or more coverage areas, and the divided coverage area is used as an access control granularity, to perform access control on the terminal in the coverage area of the network device. For example, the condition may be a strength range of the reference signal, and when the strength of the reference signal measured by the terminal device is within the strength range, the coverage area is a coverage area of the terminal device. The strength of the reference signal may be specifically reference signal received power (RSRP), may be reference signal received quality (RSRQ), or may be a reference signal to interference plus noise ratio (SINR), and certainly, or may be other measurement quantity. Examples are not listed one by one herein.

The reference signal (RS) is a "pilot" signal, and is a known signal provided by a transmit end to a receive end for channel estimation or channel sounding. For example, a network device may serve as the transmit end, and a terminal device may serve as the receive end.

In an implementation, the "coverage area" of an MTC terminal device may be coverage areas corresponding to one or more coverage enhancement (CE) levels.

The "access control mode" in this application may be used to instruct the terminal device to access a current cell, enter a preset access control process, camp on the current cell, skip accessing the current cell, skip entering the preset access control process, or skip camping on the current cell. It should be noted herein that, specific behaviors of the terminal device instructed by the access control mode may vary based on different scenarios or implementations, and this is not specifically limited herein. The preset access control process includes any one or more of an extended access barring EAB process, a service specific access control SSAC process, an access class barring ACB process, or an application specific access control ACDC process.

Figure 2:
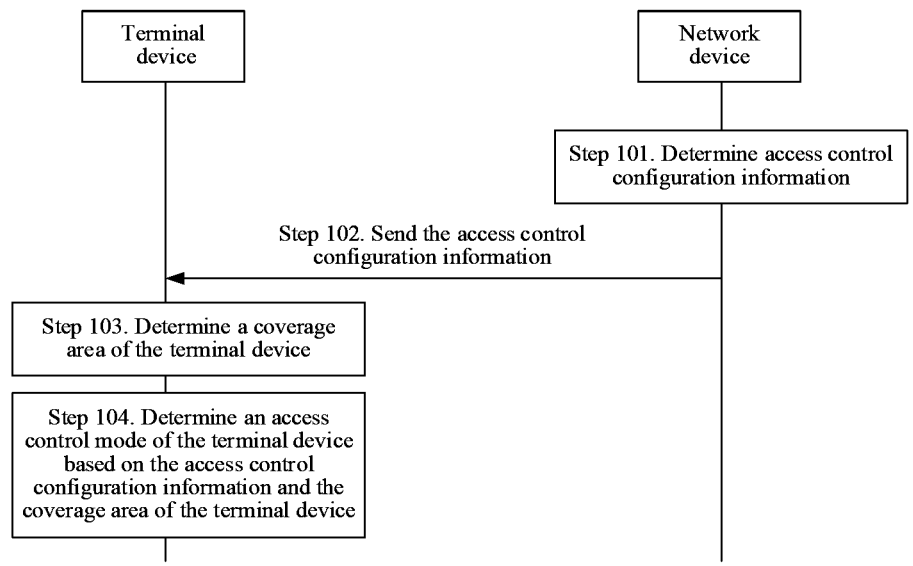
FIG. 2 is a flowchart of an access control method according to an embodiment of this application.

FIG. 2 is a flowchart of an access control method according to an embodiment of this application. This embodiment relates to a network device and a terminal device. As shown in FIG. 2, the method in this embodiment may include the following steps.

Step 101. The network device determines access control configuration information, where the access control configuration information is used to indicate an access control mode corresponding to at least one coverage area.

Specifically, the network device may determine the access control configuration information based on a load status of the network device, and a manner of determining the access control configuration information may be flexibly set based on an access control requirement of a network. The access control configuration information may be used to indicate access control modes corresponding to one or more coverage areas. The access control modes corresponding to different coverage areas may be the same, or may be different. The network device may configure the access control modes for terminal devices located within different coverage areas by using the access control configuration information, so that the terminal device may access the network by using the access control mode corresponding to the coverage to which the terminal device belongs to.

Step 102. The network device sends the access control configuration information to the terminal device, and the terminal device receives the access control configuration information sent by the network device.

The access control configuration information is used to determine the access control mode of the terminal device. Specifically, the network device may send the access control configuration information in a broadcast manner, and a specific message that carries the access control configuration information may be flexibly set based on a requirement.

Step 103. The terminal device determines a coverage area of the terminal device.

The terminal device determines the coverage area of the terminal device based on a measured signal strength of the network device.

Step 104. The terminal device determines the access control mode of the terminal device based on the access control configuration information and the coverage area of the terminal device.

The access control mode of the terminal device may be any one of the access control modes described above. For specific descriptions, refer to the foregoing descriptions, and details are not described herein again. Then the terminal device performs corresponding operations based on the access control mode of the terminal device. In this way, the access control configuration information is sent to the terminal device, so that the terminal device determines the access control mode corresponding to the coverage area of the terminal device.

There may be two specific implementations in which the network device indicates the access control mode corresponding to the at least one coverage area by using the access control configuration information. One implementation is a direct indication manner. In the direct indication manner, the access control configuration information may include at least one piece of access control mode information, the access control mode information corresponds to the at least one coverage area, the access control mode information is used to indicate the access control mode corresponding to the at least one coverage area corresponding to the access control mode information, and the at least one piece of access control mode information is used to determine the access control mode of the terminal device. The other implementation is an indirect indication manner. In the indirect indication manner, the access control configuration information includes at least one probability factor, the at least one probability factor is used to determine an access probability of the terminal device, and the access probability is used to determine the access control mode of the terminal device.

The access control mode in this application may specifically be set in many different manners.

In an implementation, the access control mode includes accessing a current cell or entering a preset access control process. Specifically, the terminal device determines, based on the access control configuration information and the coverage area of the terminal device, the access control mode of the terminal device as accessing the current cell or entering the preset access control process. When the access control mode of the terminal device is accessing the current cell, the terminal device may request to access the network device. When the access control mode of the terminal device is entering the preset access control process, the terminal device may enter the preset access control process, to further determine whether the access is barred.

In another implementation, the access control mode includes entering the preset access control process, or skipping accessing the current cell. Specifically, the terminal device determines, based on the access control configuration information and the coverage area of the terminal device, the access control mode of the terminal device as skipping accessing the current cell or entering the preset access control process. When the access control mode of the terminal device is skipping accessing the current cell, the terminal device may start a timer, and the terminal device may notify, on an radio resource control (RRC) layer, a non-access stratum (NAS) that accessing the network device is restricted. During the operation of the timer, on the RRC layer, the terminal device no longer requests to access the network device. When the access control mode of the terminal device is entering the preset access control process, the terminal device may enter the preset access control process, to further determine whether the access is barred.

In still another implementation, the access control mode includes accessing the current cell or skipping accessing the current cell. Specifically, the terminal device determines, based on the access control configuration information and the coverage area of the terminal device, the access control mode of the terminal device as accessing the current cell or skipping accessing the current cell. When the access control mode of the terminal device is accessing the current cell, the terminal device may request to access the network device. When the access control mode of the terminal device is skipping accessing the current cell, the terminal device may start a timer, and the terminal device may notify, on an RRC layer, a NAS layer that accessing the network device is restricted. During the operation of the timer, on the RRC layer, the terminal device no longer requests to access the network device.

In yet another implementation, the access control mode includes camping on the current cell or skipping camping on the current cell. Specifically, the terminal device determines, based on the access control configuration information and the coverage area of the terminal device, the access control mode of the terminal device as camping on the current cell or skipping camping on the current cell. When the access control mode of the terminal device is camping on the current cell, the terminal device may camp on the cell of the current network device, and request to access the network device. When the access control mode of the terminal device is skipping camping on the current cell, the terminal device reselects a cell of a network device to camp on, and no longer camps on the cell of the current network device.

It may be understood that, when the access control mode in any one of the foregoing implementations is indicated in the bit manner, a value "0" of the bit indicates one access control mode in any one of the foregoing implementations, and a value "1" of the bit indicates another access control mode. Description is provided by using an example in which the access control mode includes accessing the current cell or entering the preset access control process. The value "0" of the bit indicates accessing the current cell, and the value "1" of the bit indicates entering the preset access control process, or the value "0" of the bit indicates entering the preset access control process, and the value "1" of the bit indicates accessing the current cell.

The preset access control process may specifically include any one or more of an extended access barring (EAB) process, a service specific access control (SSAC) process, an access class barring (ACB) process, or an application specific access control (ACDC) process.

It should be noted that, specific steps included in the EAB process, the SSAC process, the ACB process, and the ACDC process in this application are not limited, and the steps may be the same as those in the prior art, or some adjustments or modifications may be made to the process in the prior art without changing implementable functions, so that a person skilled in the art may still determine the EAB process, the SSAC process, the ACB process, the ACDC process, and the like. This is not limited in this embodiment of this application.

Optionally, a specific implementation of step 102 may be that the network device broadcasts system information, and the system information carries the access control configuration information. The system information may be one of the following information types: a system information block SIB 2, a system information block SIB 14, a system information block SIB 1, or a master information block MIB.

In this embodiment, the network device sends the access control configuration information to the terminal device, where the access control configuration information is used to indicate the access control mode corresponding to the at least one coverage area; and the terminal device determines the access control mode of the terminal device based on the access control configuration information and the coverage area of the terminal device, to perform corresponding operations by using the access control mode of the terminal device, thereby preventing the terminal devices in a network from impacting on the network when the terminal devices simultaneously access the network, to reduce network congestion.

A technical solution in the method embodiment shown in FIG. 2 is described in detail below by using several specific embodiments.

Figure 3:
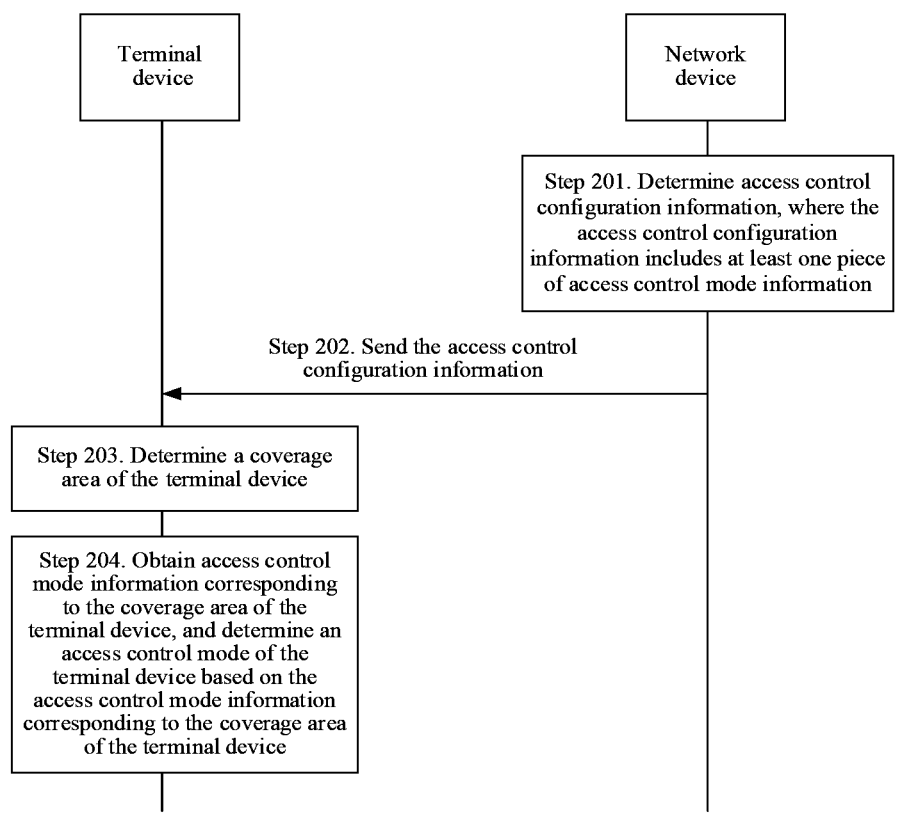
FIG. 3 is a flowchart of another access control method according to an embodiment of this application.

FIG. 3 is a flowchart of another access control method according to an embodiment of this application. In this embodiment, the access control configuration information is described in detail in a direct indication manner. As shown in FIG. 3, the method in this embodiment may include the following steps.

Step 201. A network device determines access control configuration information, where the access control configuration information includes at least one piece of access control mode information, and the access control mode information corresponds to at least one coverage area.

The access control configuration information may include the at least one piece of access control mode information, the access control mode information corresponds to the at least one coverage area, the access control mode information is used to indicate an access control mode corresponding to the at least one coverage area corresponding to the access control mode information, and the at least one piece of access control mode information is used to determine the access control mode of the terminal device. A correspondence between the coverage area and the access control mode information may be specifically: in one implementation, the coverage area is in a one-to-one correspondence with the access control mode information, that is, each coverage area corresponds to one piece of access control mode information; and in another implementation, the coverage area is in a many-to-one correspondence with the access control mode information, that is, a plurality of coverage areas correspond to one piece of the access control mode information. The correspondence may be flexibly set based on a requirement.

It may be understood that, in a one-to-one correspondence, each coverage area corresponds to one piece of access control mode information, so that access control modes of coverage areas are mutually independent, and access control modes of a plurality of coverage areas are set in a more flexible way. In a many-to-one correspondence, a plurality of coverage areas correspond to one piece of access control mode information, so that resources occupied by the access control configuration information may be reduced.

The at least one piece of access control mode information may be specifically a bitstring, or may be a bitmap (bitmap), that is, one piece of access control mode information may be one bit. A length of the access control configuration information may be flexibly set based on an access control requirement. For example, a bit is set to correspond to one coverage area, then a quantity of bits of the access control configuration information is the same as a quantity of the coverage areas, and each bit is used to indicate an access control mode within one coverage area. Certainly, it may be understood that a bit may alternatively be set to correspond to two coverage areas. Examples are not listed one by one herein.

Certainly, it may be understood that, one piece of access control mode information may alternatively be a plurality of bits, for example, three bits, and every three bits are used to indicate the access control mode within the at least one coverage area. The quantity of bits may be flexibly set based on a requirement.

The at least one piece of access control mode information may be specifically a list, in other words, one piece of access control mode information may be a parameter carried in a line of the list, and the terminal device may determine the access control mode indicated by the line based on the parameter. For example, a line is set to correspond to one coverage area, then a quantity of lines in the list of the access control configuration information is the same as a quantity of the coverage areas, and each line is used to indicate an access control mode within one coverage area. Certainly, it may be understood that a line may alternatively be set to correspond to two coverage areas. Examples are not listed one by one herein.

In one implementation, the at least one coverage area is pre-configured at least one coverage area. The network device may pre-configure the at least one coverage area, in other words, the coverage area of the network device is divided in advance, and the terminal device is notified of a condition under which each coverage area meets a signal strength, so that the terminal device may determine, based on the signal strength measured by the terminal device, the coverage area of the terminal device.

In another implementation, the at least one coverage area is dynamically indicated by the network device to the terminal device. Specifically, the access control configuration information may further include coverage area information that is used to indicate the at least one coverage area, and the coverage area information is used to indicate the division of the coverage area to the terminal device. For example, the access control configuration information further includes n measurement values, and the n measurement values are used to indicate n+1 coverage areas. By using n=3 as an example, the access control configuration information further includes three measurement values, respectively, a1, a2, and a3, and the three measurement values indicate four coverage areas, respectively, a coverage area 1, a coverage area 2, a coverage area 3, and a coverage area 4, where a signal measurement result of the coverage area 1 is less than a1, a signal measurement result of the coverage area 2 is greater than or equal to a1 and is less than a2, a signal measurement result of the coverage area 3 is greater than or equal to a2 and is less than a3, and a signal measurement result of the coverage area 4 is greater than or equal to a4. The network device may flexibly adjust coverage area division in a network based on an access control requirement.

Optionally, the coverage area information may specifically include at least one RSRP value, for example, the a1, the a2, and the a3 are all RSRP values.

Step 202. The network device sends the access control configuration information to the terminal device, and the terminal device receives the access control configuration information sent by the network device.

Step 203. The terminal device determines a coverage area of the terminal device.

Step 204. The terminal device obtains access control mode information corresponding to the coverage area of the terminal device from the at least one piece of access control mode information, and determines an access control mode of the terminal device based on the access control mode information corresponding to the coverage area of the terminal device.

For example, the access control configuration information is 0101, where the first digit corresponds to the coverage area 1, the second digit corresponds to the coverage area 2, and based on the correspondence, the fourth digit corresponds to the coverage area 4. The terminal device belongs to the coverage area 1, and then the terminal device obtains a value of the first digit of the access control configuration information, that is, 0, and "0" indicates skipping camping on the current cell. Therefore, the terminal device determines the access control mode of the terminal device as skipping camping on the current cell.

In this embodiment, the network device sends the access control configuration information to the terminal device, where the access control configuration information includes the at least one piece of access control mode information; and the terminal device determines the access control mode of the terminal device based on the at least one piece of access control mode information and the coverage area of the terminal device, to perform corresponding operations by using the access control mode of the terminal device, thereby reducing load of the network device based on the coverage area, and preventing terminal devices in a network from impacting on the network when the terminal devices simultaneously access the network, to reduce network congestion.

Figure 4:
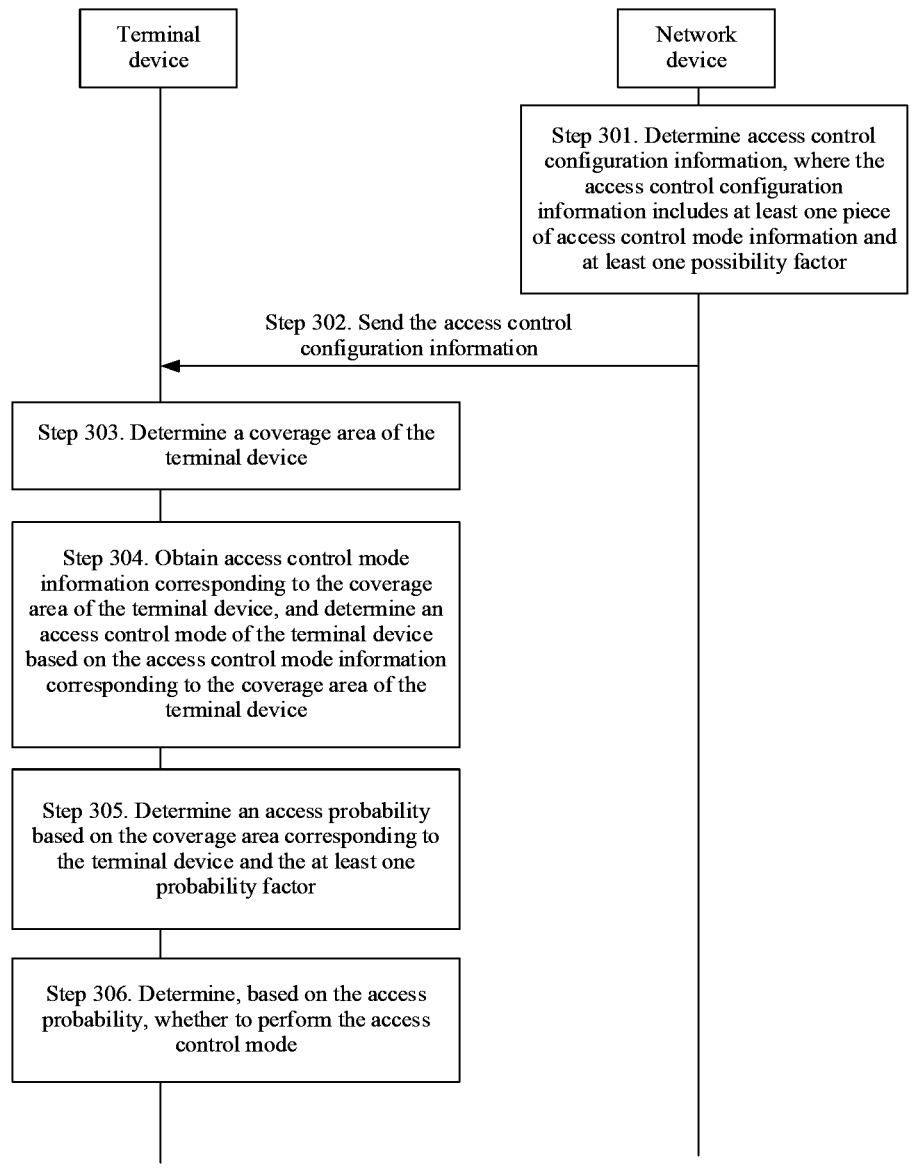
FIG. 4 is a flowchart of another access control method according to an embodiment of this application.

FIG. 4 is a flowchart of another access control method according to an embodiment of this application. A difference between this embodiment and the embodiment shown in FIG. 3 lies in that, the access control configuration information may further include at least one probability factor, the at least one probability factor is used to determine an access probability of the terminal device, and the access probability is used to determine whether to perform the access control mode of the terminal device. As shown in FIG. 4, the method in this embodiment may include the following steps.

Step 301. A network device determines access control configuration information, where the access control configuration information includes at least one piece of access control mode information and at least one possibility factor.

For specific descriptions of the at least one piece of access control mode information, refer to step 201 in the embodiment shown in FIG. 3, and details are not described herein again.

Step 302. The network device sends the access control configuration information to the terminal device, and the terminal device receives the access control configuration information sent by the network device.

Step 303. The terminal device determines a coverage area of the terminal device.

Step 304. The terminal device obtains access control mode information corresponding to the coverage area of the terminal device from the at least one piece of access control mode information, and determines an access control mode of the terminal device based on the access control mode information corresponding to the coverage area of the terminal device.

For specific descriptions of step 304, refer to step 204 in the embodiment shown in FIG. 3, and details are not described herein again.

Step 305. The terminal device determines an access probability based on the coverage area corresponding to the terminal device and the at least one probability factor.

Step 306. The terminal device determines, based on the access probability, whether to perform the access control mode.

One implementation of step 306 may be that: the terminal device obtains a first random number, and when the first random number is greater than the access probability, the terminal device determines to perform the access control mode, and when the first random number is not greater than the access probability, the terminal device determines to skip performing the access control mode. Another implementation of step 306 may be that: the terminal device obtains a first random number, and when the first random number is less than the access probability, the terminal device determines to perform the access control mode, and when the first random number is not less than the access probability, the terminal device determines to skip performing the access control mode.

One implementation in which the terminal device obtains the first random number may be that the terminal device generates the first random number, and another implementation may be that the terminal device obtains the first random number from another apparatus or module, and a specific implementation may be flexibly set based on a requirement.

Optionally, one implementation of step 305 may be that: the terminal device may determine the access probability based on reference signal received power RSRP measured by the terminal device and at least one probability factor. Optionally, the terminal device may determine the access probability based on a formula (1). The reference signal received power RSRP measured by the terminal device is related to the coverage area corresponding to the terminal device.

$$p = k_n \times q^n + k_{n-1} \times q^{n-1} + k_{n-2} \times q^{1-2} + \ldots + k_1 q^1 + k_0 \quad (1), \text{where}$$

p is the access probability, q is the reference signal received power RSRP or reference signal received quality RSRQ measured by the terminal device, $\{k_n, k_{n-1}, k_{n-2}, \ldots, k_0\}$ is the at least one probability factor, n+1 is a quantity of the at least one probability factor, and n is any natural number.

In this embodiment, the network device sends the access control configuration information to the terminal device, where the access control configuration information includes the at least one piece of access control mode information and the at least one probability factor; and the terminal device determines the access control mode of the terminal device based on the at least one piece of access control mode information and the coverage area of the terminal device, and the terminal device further determines, based on the at least one probability factor, whether to perform the access control mode, thereby reducing load of the network device based on the coverage area, and preventing terminal devices in a network from impacting on the network when the terminal devices simultaneously access the network, to reduce network congestion. In addition, terminal devices within a same coverage area may implement different access control by using the at least one probability factor.

It should be noted that the RSRP used for calculation in this application may be replaced with RSRQ, SINR or another measurement quantity, and examples are not listed one by one herein.

Figure 5:
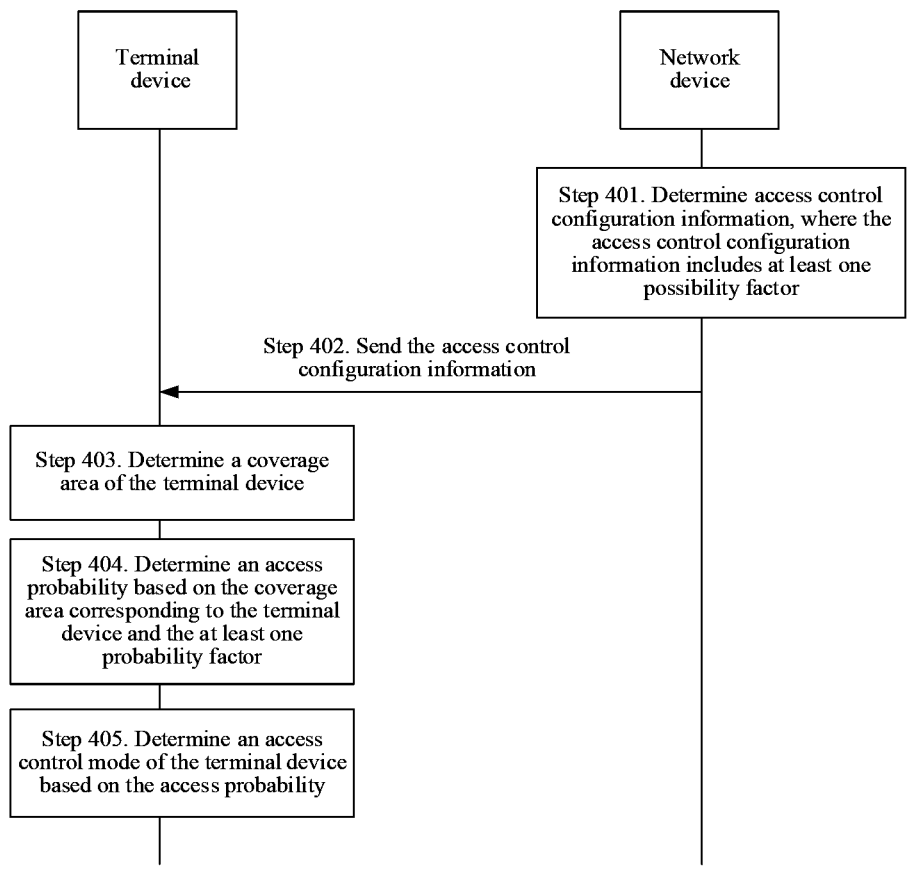
FIG. 5 is a flowchart of another access control method according to an embodiment of this application.

FIG. 5 is a flowchart of another access control method according to an embodiment of this application. In this embodiment, access control configuration information is described in detail in an indirect indication manner. As shown in FIG. 5, the method in this embodiment may include the following steps.

Step 401. A network device determines access control configuration information, where the access control configuration information includes at least one probability factor.

The at least one probability factor is used to determine an access probability of a terminal device, and the access probability is used to determine an access control mode of the terminal device.

Step 402. The network device sends the access control configuration information to the terminal device, and the terminal device receives the access control configuration information sent by the network device.

Step 403. The terminal device determines a coverage area of the terminal device.

Step 404. The terminal device determines the access probability based on the coverage area corresponding to the terminal device and the at least one probability factor.

In one implementation, the terminal device may determine the access probability based on reference signal received power RSRP measured by the terminal device and the at least one probability factor. Optionally, the terminal device may determine the access probability based on the formula (1). The reference signal received power RSRP measured by the terminal device is related to the coverage area corresponding to the terminal device.

Step 405. The terminal device determines the access control mode of the terminal device based on the access probability.

One implementation of step 405 may be that: the terminal device obtains a second random number, and when the second random number is greater than the access probability, the terminal device determines that the access control mode is a first access control mode, and when the second random number is not greater than the access probability, the terminal device determines that the access control mode is a second access control mode. Another implementation of step 404 may be that: the terminal device obtains a second random number, and when the second random number is less than the access probability, the terminal device determines that the access control mode is a first access control mode, and when the second random number is not less than the access probability, the terminal device determines that the access control mode is a second access control mode.

The first access control mode and the second access control mode are any two access control modes described above. For example, the first access control mode may be accessing a current cell, and the second access control mode may be entering a preset access control process.

It should be noted that, the first access control mode and the second access control mode may be two access control modes set in the terminal device, and the terminal device may determine one of the two as the access control mode of the terminal device by using the access control configuration information sent by the network device.

One implementation in which the terminal device obtains the second random number may be that the terminal device generates the second random number, and another implementation may be that the terminal device obtains the second random number from another apparatus or module, and a specific implementation may be flexibly set based on a requirement.

In this embodiment, the network device sends the access control configuration information to the terminal device, where the access control configuration information includes the at least one probability factor; and the terminal device determines the access control mode of the terminal device based on the at least one probability factor and the coverage area of the terminal device, to perform corresponding operations by using the access control mode of the terminal device, thereby reducing load of the network device based on the coverage area, and preventing terminal devices in a network from impacting on the network when the terminal devices simultaneously access the network, to reduce network congestion.

Figure 6:
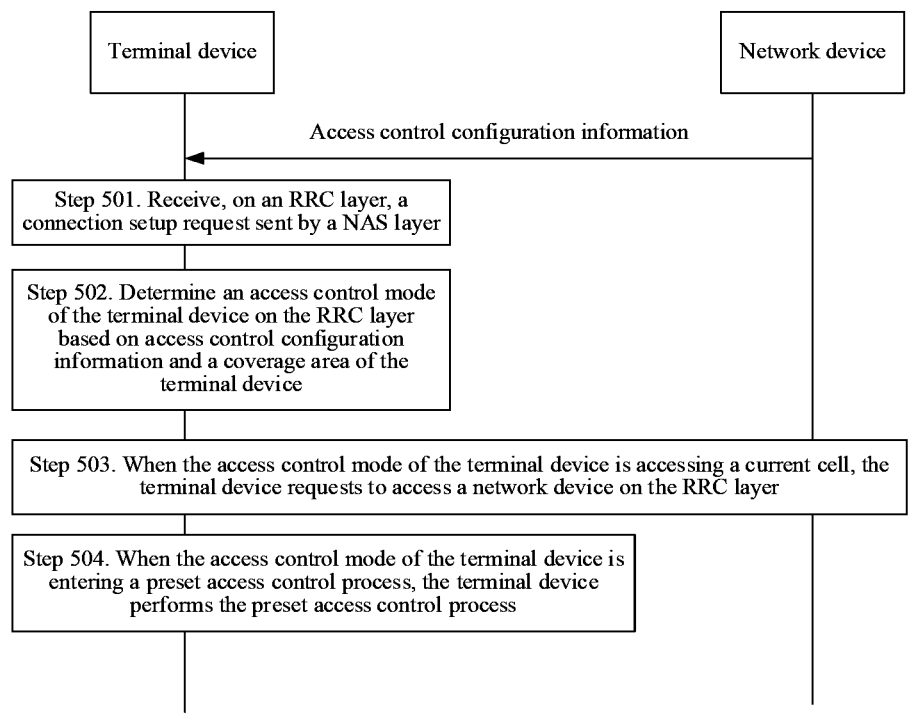
FIG. 6 is a flowchart of another access control method according to an embodiment of this application.

FIG. 6 is a flowchart of another access control method according to an embodiment of this application. In this embodiment, based on any one of the foregoing embodiments, after the receiving, by the terminal device, the access control configuration information sent by the network device, performing corresponding operations by the terminal device is described in detail. Description is provided by using an example in which the access control mode is accessing a current cell or entering a preset access control process. As shown in FIG. 6, the method in this embodiment may include the following steps.

The access control mode of the terminal device in this embodiment is specifically an access control mode corresponding to a coverage area of the terminal device.

Step 501. The terminal device receives, on an RRC layer, a connection setup request sent by a NAS layer.

Correspondingly, the terminal device sends the connection setup request on the NAS layer.

Step 502. The terminal device determines the access control mode of the terminal device on the RRC layer based on the access control configuration information and the coverage area of the terminal device.

When receiving the connection setup request sent by the NAS layer, the terminal device performs detection on the access control mode that is based on the coverage area. Specifically, the terminal device determines the access control mode corresponding to the coverage area of the terminal device based on the access control configuration information and the coverage area of the terminal device. The specific implementation may use a specific implementation of the step in any one of the foregoing embodiments, and details are not described herein again.

Step 503. When the access control mode of the terminal device is accessing the current cell, the terminal device requests to access a network device on the RRC layer.

Step 504. When the access control mode of the terminal device is entering a preset access control process, the terminal device performs the preset access control process.

In this embodiment, the network device sends the access control configuration information to the terminal device, and the terminal device determines the access control mode of the terminal device based on the access control configuration information and the coverage area of the terminal device, to perform corresponding operations by using the access control mode of the terminal device, thereby reducing load of the network device based on the coverage area, and preventing terminal devices in a network from impacting on the network when the terminal devices simultaneously access the network, to reduce network congestion.

Figure 7:
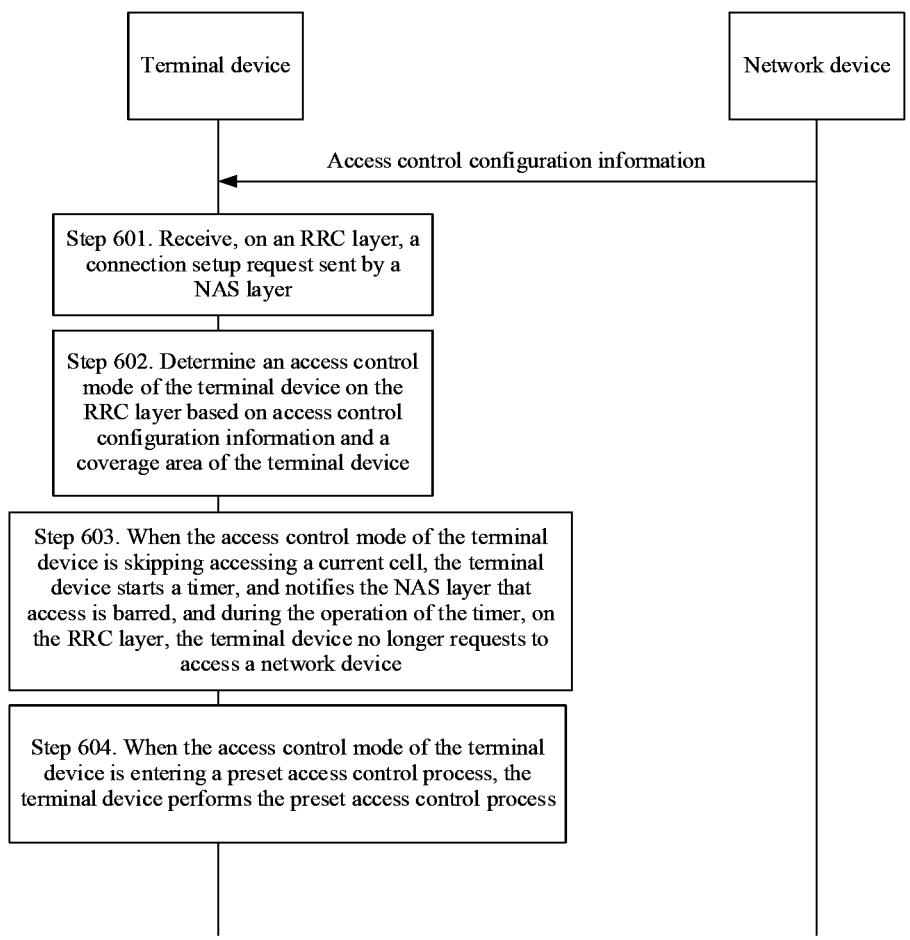
FIG. 7 is a flowchart of still another access control method according to an embodiment of this application.

FIG. 7 is a flowchart of still another access control method according to an embodiment of this application. In this embodiment, based on any one of the foregoing embodiments, after the receiving, by the terminal device, the access control configuration information sent by the network device, performing corresponding operations by the terminal device is described in detail. Description is provided by using an example in which the access control mode is skipping accessing a current cell or entering a preset access control process. As shown in FIG. 7, the method in this embodiment may include the following steps.

The access control mode of the terminal device in this embodiment is specifically an access control mode corresponding to a coverage area of the terminal device.

Step 601. The terminal device receives, on an RRC layer, a connection setup request sent by a NAS layer.

Correspondingly, the terminal device sends the connection setup request on the NAS layer.

Step 602. The terminal device determines the access control mode of the terminal device on the RRC layer based on the access control configuration information and the coverage area of the terminal device.

When receiving the connection setup request sent by the NAS layer, the terminal device performs detection on the access control mode that is based on the coverage area. Specifically, the terminal device determines the access control mode corresponding to the coverage area of the terminal device based on the access control configuration information and the coverage area of the terminal device. The specific implementation may use a specific implementation of the step in any one of the foregoing embodiments, and details are not described herein again.

Step 603. When the access control mode of the terminal device is skipping accessing the current cell, the terminal device starts a timer, and notifies the NAS layer that access is barred, and during the operation of the timer, on the RRC layer, the terminal device no longer requests to access a network device.

The terminal device notifies, on the RRC layer, the NAS layer that the access is barred, and may further notify the NAS layer of a reason why the access is barred, and the reason why the access is barred may be limitation by the coverage area. When the timer expires, the RRC layer notifies the NAS layer that the barring is canceled, and the NAS layer may send a connection setup request to the RRC layer again.

Step 604. When the access control mode of the terminal device is entering the preset access control process, the terminal device performs the preset access control process.

In this embodiment, the network device sends the access control configuration information to the terminal device, and the terminal device determines the access control mode of the terminal device based on the access control configuration information and the coverage area of the terminal device, to perform corresponding operations by using the access control mode of the terminal device, thereby reducing load of the network device based on the coverage area, and preventing terminal devices in a network from impacting on the network when the terminal devices simultaneously access the network, to reduce network congestion.

In addition, the access control mode in this embodiment is skipping accessing the current cell or entering the preset access control process, and terminal devices within some coverage areas are directly barred from access, thereby reducing load of the network device in a quicker and more effective way.

Figure 8:
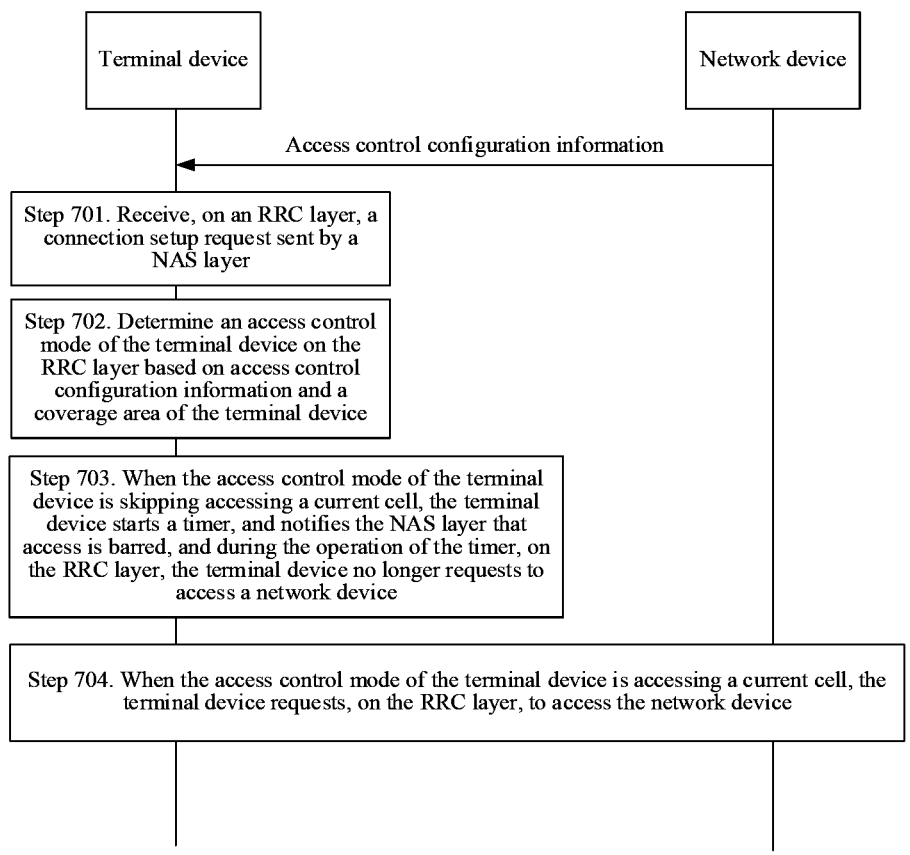
FIG. 8 is a flowchart of yet another access control method according to an embodiment of this application.

FIG. 8 is a flowchart of yet another access control method according to an embodiment of this application. In this embodiment, based on any one of the foregoing embodiments, after the receiving, by the terminal device, the access control configuration information sent by the network device, performing corresponding operations by the terminal device is described in detail. Description is provided by using an example in which the access control mode is accessing a current cell or skipping accessing the current cell. As shown in FIG. 8, the method in this embodiment may include the following steps.

The access control mode of the terminal device in this embodiment is specifically an access control mode corresponding to a coverage area of the terminal device.

Step 701. The terminal device receives, on an RRC layer, a connection setup request sent by a NAS layer.

Correspondingly, the terminal device sends the connection setup request on the NAS layer.

Step 702. The terminal device determines the access control mode of the terminal device on the RRC layer based on the access control configuration information and the coverage area of the terminal device.

When receiving the connection setup request sent by the NAS layer, the terminal device performs detection on the access control mode that is based on the coverage area. Specifically, the terminal device determines the access control mode corresponding to the coverage area of the terminal device based on the access control configuration information and the coverage area of the terminal device. The specific implementation may use a specific implementation of the step in any one of the foregoing embodiments, and details are not described herein again.

Step 703. When the access control mode of the terminal device is skipping accessing the current cell, the terminal device starts a timer, and notifies the NAS layer that access is barred, and during the operation of the timer, on the RRC layer, the terminal device no longer requests to access a network device.

The terminal device notifies, on the RRC layer, the NAS layer that the access is barred, and may further notify the NAS layer of a reason why the access is barred, and the reason why the access is barred may be limitation by the coverage area. When the timer expires, the RRC layer notifies the NAS layer that the barring is canceled, and the NAS layer may send a connection setup request to the RRC layer again.

Step 704. When the access control mode of the terminal device is accessing the current cell, the terminal device requests, on the RRC layer, to access the network device.

It should be noted that, the access control method in this embodiment may be performed after any one or more of the existing EAB process, SSAC process, ACB process, or ACDC process. Optionally, when a result of the foregoing existing detection processes is that access is allowed, the access control method of this embodiment is then performed.

In this embodiment, the network device sends the access control configuration information to the terminal device, and the terminal device determines the access control mode of the terminal device based on the access control configuration information and the coverage area of the terminal device, to perform corresponding operations by using the access control mode of the terminal device, thereby reducing load of the network device based on the coverage area, and preventing terminal devices in a network from impacting on the network when the terminal devices simultaneously access the network, to reduce network congestion.

Figure 9:
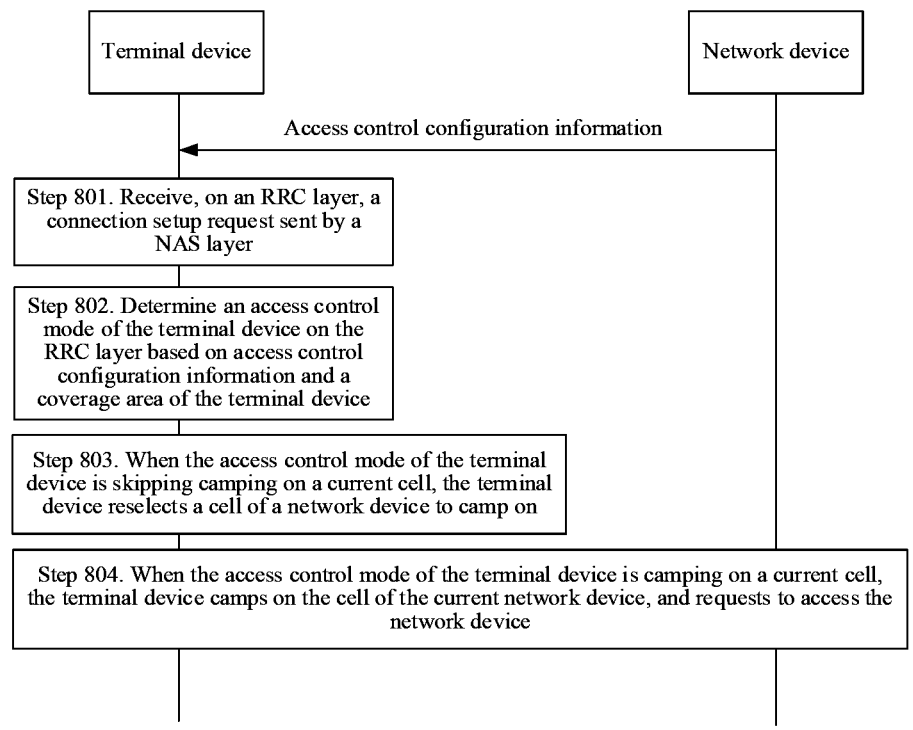
FIG. 9 is a flowchart of yet another access control method according to an embodiment of this application.

FIG. 9 is a flowchart of yet another access control method according to an embodiment of this application. In this embodiment, based on any one of the foregoing embodiments, after the receiving, by the terminal device, the access control configuration information sent by the network device, performing corresponding operations by the terminal device is described in detail. Description is provided by using an example in which the access control mode is camping on a current cell or skipping camping on the current cell. As shown in FIG. 9, the method in this embodiment may include the following steps.

The access control mode of the terminal device in this embodiment is specifically an access control mode corresponding to a coverage area of the terminal device.

Step 801. The terminal device receives, on an RRC layer, a connection setup request sent by a NAS layer.

Correspondingly, the terminal device sends the connection setup request on the NAS layer.

Step 802. The terminal device determines the access control mode of the terminal device on the RRC layer based on the access control configuration information and the coverage area of the terminal device.

When receiving the connection setup request sent by the NAS layer, the terminal device performs detection on the access control mode that is based on the coverage area. Specifically, the terminal device determines the access control mode corresponding to the coverage area of the terminal device based on the access control configuration information and the coverage area of the terminal device. The specific implementation may use a specific implementation of the step in any one of the foregoing embodiments, and details are not described herein again.

Step 803. When the access control mode of the terminal device is skipping camping on the current cell, the terminal device reselects a cell of a network device to camp on.

Step 804. When the access control mode of the terminal device is camping on the current cell, the terminal device camps on the cell of the current network device, and requests to access the network device.

The access control configuration information in this embodiment may be specifically sent by using the SIB 1. When the terminal device determines, based on the access control configuration information, the access control mode corresponding to the coverage area of the terminal device as skipping camping on the current cell, the terminal device may not read the SIB 2, thereby reducing power consumption of the terminal device.

In this embodiment, the network device sends the access control configuration information to the terminal device, where the access control configuration information is used to indicate that the access control mode of the terminal device is camping on the current cell or skipping camping on the current cell. To be specific, by controlling whether the terminal device can camp, access of terminal devices within different coverage areas is controlled, thereby reducing load of the network device based on the coverage area, and preventing terminal devices in a network from impacting on the network when the terminal devices simultaneously access the network, to reduce network congestion.

Figure 10:
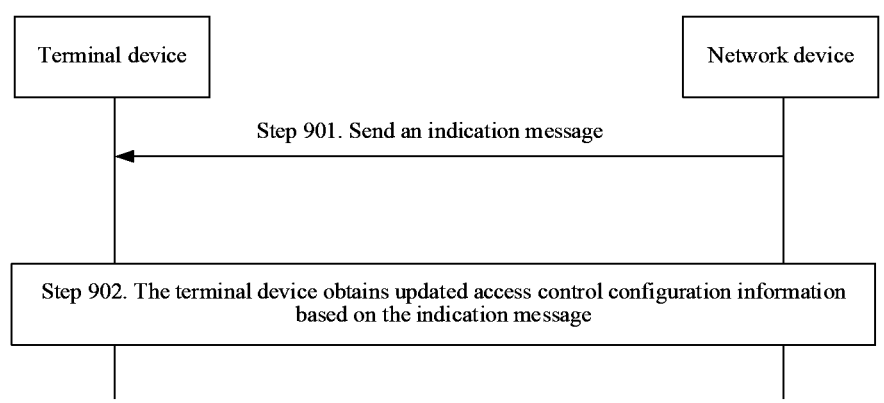
FIG. 10 is a flowchart of yet another access control method according to an embodiment of this application.

FIG. 10 is a flowchart of yet another access control method according to an embodiment of this application. Based on any one of the foregoing embodiments, in this embodiment, the network device may further send an indication message to the terminal device, and the indication message is used to indicate that the access control configuration information is already updated or to be updated. As shown in FIG. 10, the method in this embodiment may specifically include the following steps.

Step 901. The network device sends the indication message to the terminal device, and the terminal device receives the indication message sent by the network device.

The indication message is used to indicate that the access control configuration information is already updated or to be updated, and the indication message may be carried in a paging message and/or system information.

In one implementation, after the access control configuration information of the network device changes, the network device sends the indication message to the terminal device, and the terminal device reads updated access control configuration information in the system information based on the indication message. In another implementation, when the access control configuration information of the network device is to be changed, the network device sends the indication message to the terminal device, and the terminal device re-reads updated access control configuration information in the system information based on the indication message. In this way, the power consumption of the terminal device is reduced.

Step 902. The terminal device obtains updated access control configuration information based on the indication message.

Description is provided by using an example in which the indication message is carried in a paging message. When the access control configuration information is already updated or to be updated, the network device may send the paging message to the terminal device, and the paging message carries the indication message. After receiving the indication message, the terminal device learns that the access control configuration information is already updated or to be updated, so that the terminal device re-reads the system information, to obtain the updated access control configuration information.

Optionally, in one implementation, the indication message includes one piece of bit information, and the one piece of bit information is used to indicate that the access control configuration information is already updated or to be updated. Correspondingly, one implementation of step 902 may be that: the terminal device obtains the updated access control configuration information based on the one piece of bit information.

In another implementation, the indication message includes M pieces of bit information, where M is a quantity of pieces of the at least one piece of access control mode information, each piece of bit information corresponds to one piece of access control mode information, and each piece of bit information is used to indicate that the access control mode information corresponding to the bit information is already updated or to be updated, where M is any integer. Correspondingly, one implementation of step 902 may be that: the terminal device obtains the bit information of the terminal device from the M pieces of bit information, and determines, based on the bit information of the terminal device, whether the access control mode information of the terminal device is already updated or to be updated; and the terminal device obtains the updated access control configuration information when the access control mode information of the terminal device is updated or to be updated, where the bit information of the terminal device is a bit corresponding to the access control mode information corresponding to the coverage area of the terminal device.

In still another implementation, the indication message includes N pieces of bit information, where N is a quantity of the at least one coverage area, each piece of bit information corresponds to one coverage area, and each piece of bit information is used to indicate that access control information corresponding to the coverage area corresponding to the bit information is already updated or to be updated, where N is any integer. Correspondingly, one implementation of step 902 may be that: the terminal device obtains the bit information corresponding to the coverage area of the terminal device from the N pieces of bit information, and determines, based on the bit information corresponding to the coverage area of the terminal device, whether the access control mode information corresponding to the coverage area of the terminal device is already updated or to be updated; and the terminal device obtains the updated access control configuration information when the access control mode information corresponding to the coverage area of the terminal device is already updated or to be updated.

In this embodiment, the network device sends the access control configuration information to the terminal device, where the access control configuration information is used to indicate the access control mode corresponding to the at least one coverage area; and the terminal device determines the access control mode of the terminal device based on the access control configuration information and the coverage area of the terminal device, to perform corresponding operations by using the access control mode of the terminal device, thereby preventing terminal devices in a network from impacting on the network when the terminal devices simultaneously access the network, to reduce network congestion. When the access control configuration information is already updated or to be updated, the network device may send the indication message to the terminal device, so that the terminal device promptly obtains the updated access control configuration information based on the indication message, to implement flexible adjustment on the access control mode of the terminal device in the network.

It may be understood that, the access control apparatus in this application may be a terminal device, or may be a network device, configured to implement the access control method in the foregoing embodiments.

It may be understood that, in the foregoing embodiments, the methods or the steps performed by the terminal device may alternatively be implemented by a chip inside the terminal device. The methods or the steps performed by the network device may alternatively be implemented by a chip inside the network device.

Figure 11:
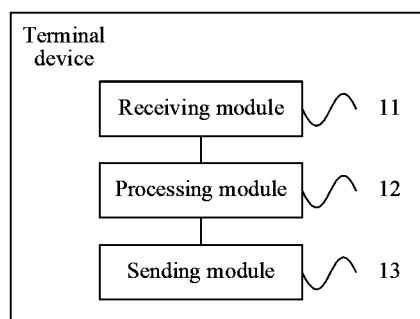
FIG. 11 is a schematic structural diagram of a terminal device according to an embodiment of this application.

FIG. 11 is a schematic structural diagram of a terminal device according to an embodiment of this application. As shown in FIG. 11, the terminal device in this embodiment includes: a receiving module 11 and a processing module 12.

The receiving module 11 is configured to receive access control configuration information sent by a network device, where the access control configuration information is used to indicate an access control mode corresponding to at least one coverage area.

The processing module 12 is configured to: determine a coverage area of the terminal device, and determine the access control mode of the terminal device based on the access control configuration information and the coverage area of the terminal device.

In some embodiments, the access control configuration information includes at least one piece of access control mode information, where the access control mode information corresponds to the at least one coverage area; and the processing module 12 is configured to: obtain access control mode information corresponding to the coverage area of the terminal device from the at least one piece of access control mode information, and determine the access control mode of the terminal device based on the access control mode information corresponding to the coverage area of the terminal device.

In some embodiments, the access control configuration information further includes at least one probability factor, and the processing module 12 is further configured to: determine an access probability based on the coverage area corresponding to the terminal device and the at least one probability factor; and determine, based on the access probability, whether to perform the access control mode.

In some embodiments, the processing module 12 is configured to: obtain a first random number, and when the first random number is greater than the access probability, determine to perform the access control mode, and when the first random number is not greater than the access probability, determine to skip performing the access control mode; or obtain a first random number, and when the first random number is less than the access probability, determine to perform the access control mode, and when the first random number is not less than the access probability, determine to skip performing the access control mode.

In some embodiments, the access control configuration information includes at least one probability factor, and the processing module 12 is configured to: determine an access probability based on the coverage area corresponding to the terminal device and the at least one probability factor; and determine the access control mode of the terminal device based on the access probability.

In some embodiments, the processing module 12 is configured to determine the access probability based on a formula $p=k_n \times q^n + k_{n-1} \times q^{n-1} + k_{n-2} \times q^{n-2} + \ldots k_1 \times q^1 + k_0$, where p is the access probability, q is reference signal received power RSRP or reference signal received quality RSRQ measured by the terminal device, $\{k_n, k_{n-1}, k_{n-2}, \ldots, k_0\}$ is the at least one probability factor, and n is any natural number.

In some embodiments, the processing module 12 is configured to: obtain a second random number, and when the second random number is greater than the access probability, determine that the access control mode is a first access control mode, and when the second random number is not greater than the access probability, determine that the access control mode is a second access control mode; or obtain a second random number, and when the second random number is less than the access probability, determine that the access control mode is a first access control mode, and when the second random number is not less than the access probability, determine that the access control mode is a second access control mode.

In some embodiments, the access control mode includes accessing a current cell, entering a preset access control process, camping on the current cell, skipping accessing the current cell, skipping entering the preset access control process, or skipping camping on the current cell, where the preset access control process includes any one or more of an extended access barring EAB process, a service specific access control SSAC process, an access class barring ACB process, or an application specific access control ACDC process, and the first access control mode and the second access control mode are any two access control modes.

In some embodiments, when the access control mode of the terminal device is the skipping accessing the current cell, the processing module 12 is further configured to: start a timer, and notify a non-access stratum that the current cell is barred from being accessed; or when the access control mode of the terminal device is the skipping camping on the current cell, the processing module 12 is further configured to perform cell reselection.

In some embodiments, the receiving module 11 is further configured to receive an indication message sent by the network device, where the indication message is used to indicate that the access control configuration information is already updated or to be updated; and the processing module 12 is further configured to obtain updated access control configuration information based on the indication message.

In some embodiments, the indication message includes one piece of bit information, and the processing module 12 is configured to: obtain updated access control configuration information based on the one piece of bit information; or the indication message includes M pieces of bit information, where M is a quantity of pieces of the at least one piece of access control mode information, and each piece of bit information corresponds to one piece of access control mode information, and the processing module 12 is configured to: obtain bit information of the terminal device from the M pieces of bit information; determine, based on the bit information of the terminal device, whether the access control mode information of the terminal device is already updated or to be updated; and obtain the updated access control configuration information when the access control mode information of the terminal device is updated or to be updated, where the bit information of the terminal device is a bit corresponding to the access control mode information corresponding to the coverage area of the terminal device; or the indication message includes N pieces of bit information, where N is a quantity of the at least one coverage area, and each piece of bit information corresponds to one coverage area, and the processing module 12 is configured to: obtain bit information corresponding to the coverage area of the terminal device from the N pieces of bit information; determine, based on the bit information corresponding to the coverage area of the terminal device, whether the access control mode information corresponding to the coverage area of the terminal device is already updated or to be updated; and obtain the updated access control configuration information when the access control mode information corresponding to the coverage area of the terminal device is already updated or to be updated.

Certainly, it may be understood that, the terminal device in this embodiment may further include a sending module 13, configured to send information or a message to another device.

The terminal device in this embodiment may be configured to perform technical solutions performed by the terminal device or a chip of the terminal device in the foregoing method embodiments, the implementation principles and technical effects thereof are similar, and for functions of the modules, refer to corresponding descriptions in the method embodiments, and details are not described herein again.

Figure 12:
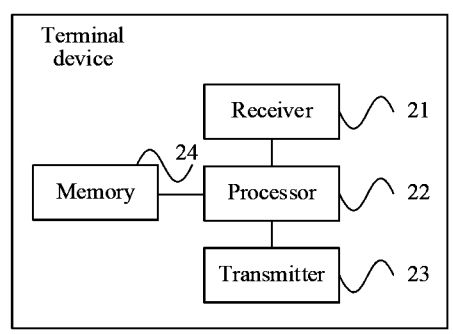
FIG. 12 is a schematic structural diagram of another terminal device according to an embodiment of this application.

FIG. 12 is a schematic structural diagram of another terminal device according to an embodiment of this application. As shown in FIG. 12, the terminal device in this embodiment includes: a receiver 21 and a processor 22.

In hardware implementation, the receiving module 11 may be the receiver 21 in this embodiment. The receiver 21 may alternatively correspond to a transceiver. It may be understood that the terminal device may further include a transmitter 23. The sending module 13 may be the transmitter 23 in this embodiment, and the transmitter 23 may alternatively correspond to a transceiver. The processing module 12 may be embedded in or independent of the processor 22 of the terminal device in a hardware form.

The receiver 21 may include a necessary radio frequency communications device such as a frequency mixer. The processor 22 may include at least one of a central processing unit (CPU), a digital signal processor (DSP), a microcontroller (MCU), an application-specific integrated circuit (ASIC), or a field programmable gate array (FPGA).

Optionally, the terminal device in this embodiment may further include a memory 24, the memory 24 is configured to store a program instruction, and the processor 22 is configured to invoke the program instruction in the memory 24 to perform the foregoing solutions.

The program instruction may be implemented in a form of a software functional unit and can be sold or used as an independent product, and the memory 24 may be a computer-readable storage medium in any form. Based on such an understanding, all or some of the technical solutions of this application may be implemented in a form of a software product. The software product includes several instructions for instructing a computer device, which may be specifically the processor 22, to perform all or some of the steps of the terminal device in the embodiments of this application. The foregoing computer-readable storage medium includes: any medium that can store program code, such as a USB flash drive, a removable hard disk, a read-only memory (Read-Only Memory, ROM), a random access memory (Random Access Memory, RAM), a magnetic disk, or an optical disc.

The terminal device in this embodiment may be configured to perform technical solutions performed by the terminal device or a chip of the terminal device in the foregoing method embodiments, the implementation principles and technical effects thereof are similar, and for functions of the devices, refer to corresponding descriptions in the method embodiments, and details are not described herein again.

Figure 13:
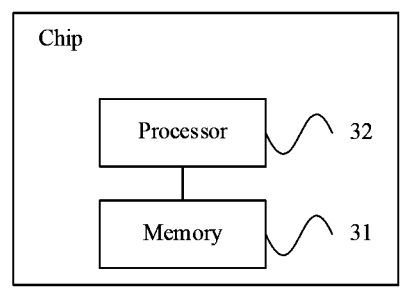
FIG. 13 is a schematic structural diagram of a chip according to an embodiment of this application.

FIG. 13 is a schematic structural diagram of a chip according to an embodiment of this application. As shown in FIG. 13, the chip in this embodiment may be a chip of a terminal device, and the chip in this embodiment may include: a memory 31 and a processor 32. The memory 31 is communicatively connected to the processor 32. It should be noted that the chip may further include another structure or unit that forms a chip, for example, an interface or a slot. This is not limited herein.

In hardware implementation, the receiving module 11, the processing module 12, and the sending module 13 may be embedded in or independent of the processor 32 of the chip in a hardware form.

The memory 31 is configured to store a program instruction, and the processor 32 is configured to invoke the program instruction in the memory 31, to perform the foregoing solutions.

Figure 14:
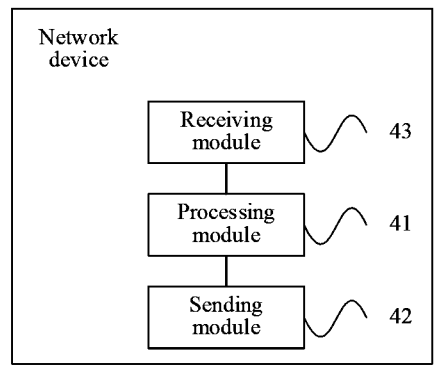
FIG. 14 is a schematic structural diagram of a network device according to an embodiment of this application.

The chip in this embodiment may be configured to perform technical solutions performed by the terminal device or a chip inside the terminal device in the foregoing method embodiments of this application, the implementa- FIG. 14 is a schematic structural diagram of a network device according to an embodiment of this application. As shown in FIG. 14, the network device in this embodiment may include: a processing module 41 and a sending module 42.

The processing module 41 is configured to determine access control configuration information, where the access control configuration information is used to indicate an access control mode corresponding to at least one coverage area.

The sending module 42 is configured to send the access control configuration information to a terminal device, where the access control configuration information is used to determine the access control mode of the terminal device.

In some embodiments, the access control configuration information includes at least one piece of access control mode information, the access control mode information corresponds to the at least one coverage area, the access control mode information is used to indicate the access control mode corresponding to the at least one coverage area corresponding to the access control mode information, and the at least one piece of access control mode information is used to determine the access control mode of the terminal device.

In some embodiments, the access control configuration information includes at least one probability factor, the at least one probability factor is used to determine an access probability of the terminal device, and the access probability is used to determine the access control mode of the terminal device.

In some embodiments, the access control mode includes accessing a current cell, entering a preset access control process, skipping accessing the current cell, camping on the current cell, skipping camping on the current cell, or skipping entering the preset access control process, where the preset access control process includes any one or more of an extended access barring EAB process, a service specific access control SSAC process, an access class barring ACB process, or an application specific access control ACDC process.

In some embodiments, the sending module 42 is further configured to send an indication message to the terminal device, where the indication message is used to indicate that the access control configuration information is already updated or to be updated, and the indication message is carried in a paging message and/or system information.

In some embodiments, the indication message includes one piece of bit information, and the one piece of bit information is used to indicate that the access control configuration information is already updated or to be updated; or the indication message includes M pieces of bit information, where M is a quantity of pieces of the at least one piece of access control mode information, each piece of bit information corresponds to one piece of access control mode information, and each piece of bit information is used to indicate that the access control mode information corresponding to the bit information is already updated or to be updated; or the indication message includes N pieces of bit information, where N is a quantity of the at least one coverage area, each piece of bit information corresponds to one coverage area, and each piece of bit information is used to indicate that access control information corresponding to the coverage area corresponding to the bit information is already updated or to be updated.

Certainly, it may be understood that, the network device in this embodiment may further include a receiving module 43, configured to send information or a message to another device.

The network device in this embodiment may be configured to perform technical solutions performed by the network device or a chip of the network device in the foregoing method embodiments, the implementation principles and technical effects thereof are similar, and for functions of the modules, refer to corresponding descriptions in the method embodiments, and details are not described herein again.

Figure 15:
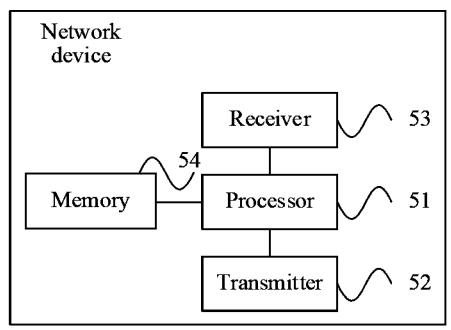
FIG. 15 is a schematic structural diagram of another network device according to an embodiment of this application.

FIG. 15 is a schematic structural diagram of another network device according to an embodiment of this application. As shown in FIG. 15, the network device in this embodiment includes: a processor 51 and a transmitter 52.

In hardware implementation, the processing module 41 may be embedded in or independent of the processor 51 of the network device in a hardware form. The sending module 42 may be the transmitter 52 in this embodiment. The transmitter 52 may alternatively correspond to a transceiver. It may be understood that the network device may further include a receiver 53, the receiving module 43 may be the receiver 53 in this embodiment, and the receiver 53 may alternatively correspond to a transceiver.

The transmitter 52 may include a necessary radio frequency communications device such as a frequency mixer. The processor 51 may include at least one of a CPU, a DSP, an MCU, an ASIC, or an FPGA.

Optionally, the network device in this embodiment may further include a memory 54, the memory 54 is configured to store a program instruction, and the processor 51 is configured to invoke the program instruction in the memory 54, to perform the foregoing solutions.

The network device in this embodiment may be configured to perform technical solutions performed by the network device or a chip of the network device in the foregoing method embodiments, the implementation principles and technical effects thereof are similar, and for functions of the devices, refer to corresponding descriptions in the method embodiments, and details are not described herein again.

Figure 16:
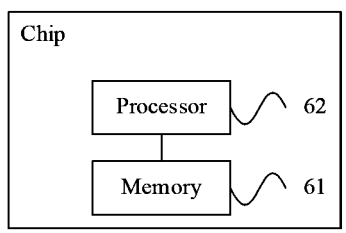
FIG. 16 is a schematic structural diagram of another chip according to an embodiment of this application.

FIG. 16 is a schematic structural diagram of another chip according to an embodiment of this application. As shown in FIG. 16, the chip in this embodiment may be a chip of the network device, and the chip in this embodiment may include: a memory 61 and a processor 62. The memory 61 is communicatively connected to the processor 62. The processor 62 may include, for example, at least one of a CPU, a DSP, an MCU, an ASIC, or an FPGA. It should be noted that the chip may further include another structure or unit that forms a chip, for example, an interface or a slot. This is not limited herein.

In hardware implementation, the receiving module 43, the processing module 41, and the sending module 42 may be embedded in or independent of the processor 62 of the chip in a hardware form.

The memory 61 is configured to store a program instruction, and the processor 62 is configured to invoke the program instruction in the memory 61, to perform the foregoing solutions.

The program instruction may be implemented in a form of a software functional unit and can be sold or used as an independent product, and the memory may be a computer-readable storage medium in any form. Based on such an understanding, all or some of the technical solutions of this application may be implemented in a form of a software product. The software product includes several instructions for instructing a computer device, which may be specifically the processor 62, to perform all or some of the steps of the network device in the embodiments of this application. The foregoing computer-readable storage medium includes any medium that can store program code, such as a USB flash drive, a removable hard disk, a ROM, a RAM, a magnetic disk, or an optical disc.

The chip in this embodiment may be configured to perform technical solutions performed by the network device or a chip inside the network device in the foregoing method embodiments of this application, the implementation principles and technical effects thereof are similar, and for functions of the modules, refer to corresponding descriptions in the method embodiments, and details are not described herein again.

It should be noted that, module division in the embodiments of this application is an example and is merely a logical function division. During actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive Solid State Disk (SSD)), or the like.

What is claimed is:

1. A method, comprising:
   receiving, by a terminal device, access control configuration information from a network device, wherein the access control configuration information comprises a reference signal receiving power (RSRP) value, the RSRP value indicates a first coverage area and a second coverage area of the terminal device, a signal measurement result of the first coverage area is less than the RSRP value, a signal measurement result of the second coverage area is larger than the RSRP value, the first coverage area corresponds to a first access control mode, the second coverage area corresponds to a second access control mode, the first access control mode comprises skipping accessing the current cell, the second access control mode comprises entering a preset access control process, wherein the preset access control process comprises an extended access barring (EAB) process; and
   determining, by the terminal device, an access control mode of the terminal device based on the access control configuration information.

2. The method according to claim 1, further comprising:
   measuring, by the terminal device, a strength range of a reference signal, and the strength range of the reference signal corresponds to the coverage area of the terminal device.

3. The method according to claim 1, wherein the access control configuration information is carried in a system information, wherein the system information comprises a system information block (SIB) 14.

4. The method according to claim 1, wherein
   the preset access control process comprises any one or more of an extended access barring (EAB) process, a service specific access control (SSAC) process, an access class barring (ACB) process, or an application specific access control (ACDC) process.

5. The method according to claim 1, wherein
   the first coverage area corresponds to one or more coverage enhancement level, the second coverage area corresponds to one or more coverage enhancement level.

6. A method, comprising:
   determining, by a network device, access control configuration information, wherein the access control configuration information comprises a reference signal receiving power (RSRP) value, the RSRP value indicates a first coverage area and a second coverage area of a terminal device, a signal measurement result of the first coverage area is less than the RSRP value, a signal measurement result of the second coverage area is larger than the RSRP value, the first coverage area corresponds to a first access control mode, the second coverage area corresponds to a second access control mode, the first access control mode comprises skipping accessing the current cell, the second access control mode comprises entering a preset access control process, wherein the preset access control process comprises an extended access barring (EAB) process; and
   sending, by the network device, the access control configuration information to the terminal device, wherein the access control configuration information is used to determine an access control mode by the terminal device.

7. The method according to claim 6, wherein the access control configuration information is carried in a system information, wherein the system information comprises a system information block (SIB) 14.

8. The method according to claim 6, wherein
the preset access control process comprises any one or more of an extended access barring (EAB) process, a service specific access control (SSAC) process, an access class barring (ACB) process, or an application specific access control (ACDC) process.

9. An apparatus, comprising:
one or more processors, and
a non-transitory storage medium configured to store program instructions;
wherein, when executed by the one or more processors, the instructions cause the apparatus to perform a method comprising:
receiving access control configuration information from a network device, wherein the access control configuration information comprises a reference signal receiving power (RSRP) value, the RSRP value indicates a first coverage area and a second coverage area of a terminal device, a signal measurement result of the first coverage area is less than the RSRP value, a signal measurement result of the second coverage area is larger than the RSRP value, the first coverage area corresponds to a first access control mode, the second coverage area corresponds to a second access control mode, the first access control mode comprises skipping accessing the current cell, the second access control mode comprises entering a preset access control process, wherein the preset access control process comprises an extended access barring (EAB) process; and
determining an access control mode of the terminal device based on the access control configuration information.

10. The apparatus according to claim 9, wherein the method further comprises:
measuring a strength range of a reference signal, and the strength range of the reference signal corresponds to the coverage area of the terminal device.

11. The apparatus according to claim 9, wherein the access control configuration information is carried in a system information, wherein the system information comprises a system information block (SIB) 14.

12. The apparatus according to claim 9, wherein
the preset access control process comprises any one or more of an extended access barring (EAB) process, a service specific access control (SSAC) process, an access class barring (ACB) process, or an application specific access control (ACDC) process.

13. The apparatus according to claim 12, wherein
the first coverage area corresponds to one or more coverage enhancement level, the second coverage area corresponds to one or more coverage enhancement level.

14. An apparatus, comprising:
one or more processors, and
a non-transitory storage medium configured to store program instructions;
wherein, when executed by the one or more processors, the instructions cause the apparatus to perform a method comprising:
determining access control configuration information, wherein the access control configuration information comprises a reference signal receiving power (RSRP) value, the RSRP value indicates a first coverage area and a second coverage area of a terminal device, a signal measurement result of the first coverage area is less than the RSRP value, a signal measurement result of the second coverage area is larger than the RSRP value, the first coverage area corresponds to a first access control mode, the second coverage area corresponds to a second access control mode, the first access control mode comprises skipping accessing the current cell, the second access control mode comprises entering a preset access control process, wherein the preset access control process comprises an extended access barring (EAB) process; and
sending the access control configuration information to the terminal device, wherein the access control configuration information is used to determine an access control mode by the terminal device.

15. The apparatus according to claim 14, wherein the access control configuration information is carried in a system information, wherein the system information comprises a system information block (SIB) 14.

16. The apparatus according to claim 14, wherein the preset access control process comprises any one or more of an extended access barring (EAB) process, a service specific access control (SSAC) process, an access class barring (ACB) process, or an application specific access control (ACDC) process.

17. The apparatus according to claim 14, wherein the first coverage area corresponds to one or more coverage enhancement level, the second coverage area corresponds to one or more coverage enhancement level.

* * * * *